(12) United States Patent
Dobney et al.

(10) Patent No.: US 12,168,886 B2
(45) Date of Patent: *Dec. 17, 2024

(54) COOLING TOWER FAN CYLINDER

(71) Applicant: EvapTech, Inc., Edwardsville, KS (US)

(72) Inventors: Donald A. Dobney, Edwardsville, KS (US); Daniel J. Reith, Edwardsville, KS (US)

(73) Assignee: EvapTech, Inc., Edwardsville, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,488

(22) Filed: Dec. 13, 2022

(65) Prior Publication Data
US 2023/0183995 A1 Jun. 15, 2023

Related U.S. Application Data

(63) Continuation of application No. 17/393,132, filed on Aug. 3, 2021, now Pat. No. 11,525,276.

(60) Provisional application No. 63/061,065, filed on Aug. 4, 2020.

(51) Int. Cl.
*E04H 5/12* (2006.01)

(52) U.S. Cl.
CPC ..................... *E04H 5/12* (2013.01)

(58) Field of Classification Search
CPC ......... E04H 12/30; E04H 12/32; E04H 12/34; E04H 12/342; E04H 12/344; E04H 5/10; E04H 5/12
See application file for complete search history.

(56) References Cited

U.S. PATENT DOCUMENTS

| | | | | |
|---|---|---|---|---|
| 1,631,051 A * | 5/1927 | Nichols | ................... | B65D 90/08 220/4.12 |
| 4,036,390 A * | 7/1977 | Morse | ................... | B65D 90/08 220/565 |
| 4,112,644 A * | 9/1978 | Allen | ................... | B65D 90/08 220/4.12 |
| 4,989,751 A * | 2/1991 | Gillett | ................... | E04H 7/30 220/648 |
| 7,188,747 B2 * | 3/2007 | Bennett | ................ | B65D 90/205 220/9.2 |
| 11,230,853 B2 * | 1/2022 | Speciale | ................... | E04H 7/04 |

FOREIGN PATENT DOCUMENTS

EP         1889988 A2 * 2/2008 ............. E04H 12/12

* cited by examiner

*Primary Examiner* — Jessica L Laux
(74) *Attorney, Agent, or Firm* — Whiteford, Taylor & Preston, LLP; Peter J. Davis

(57) ABSTRACT

A segmented/modular cooling tower fan cylinder having basic segments, a motor segment and an access segment, assembled to form an hourglass shaped cooling tower fan cylinder to protect fan blades, reduce sound and vibration, and enhance performance. The segments are preferably molded fiberglass composite structures having integrally molded vertical and horizontal ribs and a horizontal rib stiffener which connects horizontal ribs of adjacent segments. A top ring stiffener is provided at the junction of each two adjacent segments in the top ring flange. Lifter bars may be provided inside a central vertical rib of the segment to secure cables or straps to hoist an assembled fan cylinder into its final location or to secure a safety harness for workers servicing equipment in the interior space defined by the fan cylinder.

6 Claims, 17 Drawing Sheets

TYPICAL FAN STACK PLAN VIEW

HORIZONTAL RIB STIFFENER
(ISOMETRIC VIEW)

HORIZONTAL RIB STIFFENER

SECTION B-B

SECTION C-C

Section A-A

DETAIL 1
(ACCESS SLOT FOR BOLTING)

TOP RING STIFFENER DETAIL
(TYPICAL CONNECTION - 1 PER SEGMENT)

TOP RING STIFFENER
(ISOMETRIC VIEW)

TOP RING STIFFENER

SECTION A-A

ELEVATION VIEW OF TYPICAL SEGMENT

SECTION A-A

SECTION B-B
(AT THROAT - VERTICAL & STRAIGHT)

DETAIL 1
(VIEWED FROM INSIDE OF SEGMENT)

COOLING TOWER FAN CYLINDER

BACKGROUND OF THE INVENTION

Field of The Invention

The present invention relates to fan cylinders for cooling towers.

SUMMARY OF THE INVENTION

The present invention is an improved modular cooling tower fan cylinder composed of multiple modules or "segments," including a plurality of basic segments, a motor segment and an access segment. The segments are assembled, preferably at ground level, to form a generally hourglass shaped cooling tower fan cylinder which then may be hoisted atop a cooling tower or other structure. The fan cylinder according to the invention is configured to house and protect fan blades, reduce sound and vibration, and enhance performance. The segments are preferably molded fiberglass composite structures, including a wall element having interior and exterior facing surfaces. According to preferred embodiments, the interior facing surface of the wall element of each basic segment is smooth and relatively featureless (with the exception in at least some instances of a lifting bar, discussed below). The exterior facing surface of the wall element of each segment features integrally molded vertical and horizontal ribs that intersect with one-another at right angles. At their lateral edges, the segments have flanges which are used to bolt the segments to one-another. According to a preferred embodiment, the fan cylinders of the present invention include a horizontal rib stiffener which attaches at one end to a horizontal rib of one segment and at a second end to the corresponding horizontal rib of the adjacent segment. According to a more preferred embodiment, at least one horizontal rib stiffener is at every junction between adjacent segments. According to a further embodiment, two rib stiffeners are provided at each junction between adjacent segments to join two horizontal ribs in the throat area of the fan cylinder. According to another embodiment of the invention, a top ring stiffener is provided at the junction of each two adjacent segments in the top ring flange.

According to a further embodiment of the invention, at least three segments are provided with a lifter bar, accessible from the inside surface of the wall. According to a preferred embodiment, the lifter bar is horizontally secured to a lifter cup holder that is integrally molded inside a central vertical rib of the segment. The lifter bar may be used to secure cables or straps to hoist an assembled fan cylinder into its final location. The lifter bar may also be used to secure a safety harness for workers servicing equipment in the interior space defined by the fan cylinder. The height of the lifter bar from the bottom of the segment is preferably arranged to make it convenient for use both as a lifting point and as a safety harness securing point.

Figure 1:
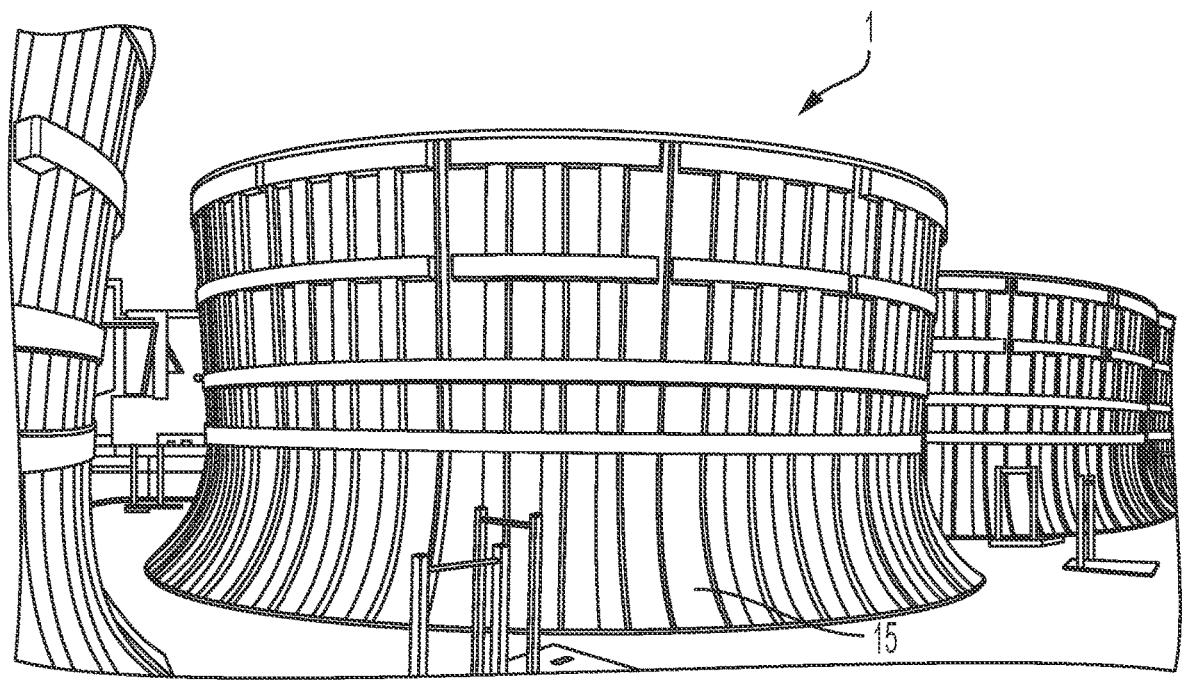
FIG. 1 is an exterior side view of a fan cylinder according to an embodiment of the invention.
Figure 2:
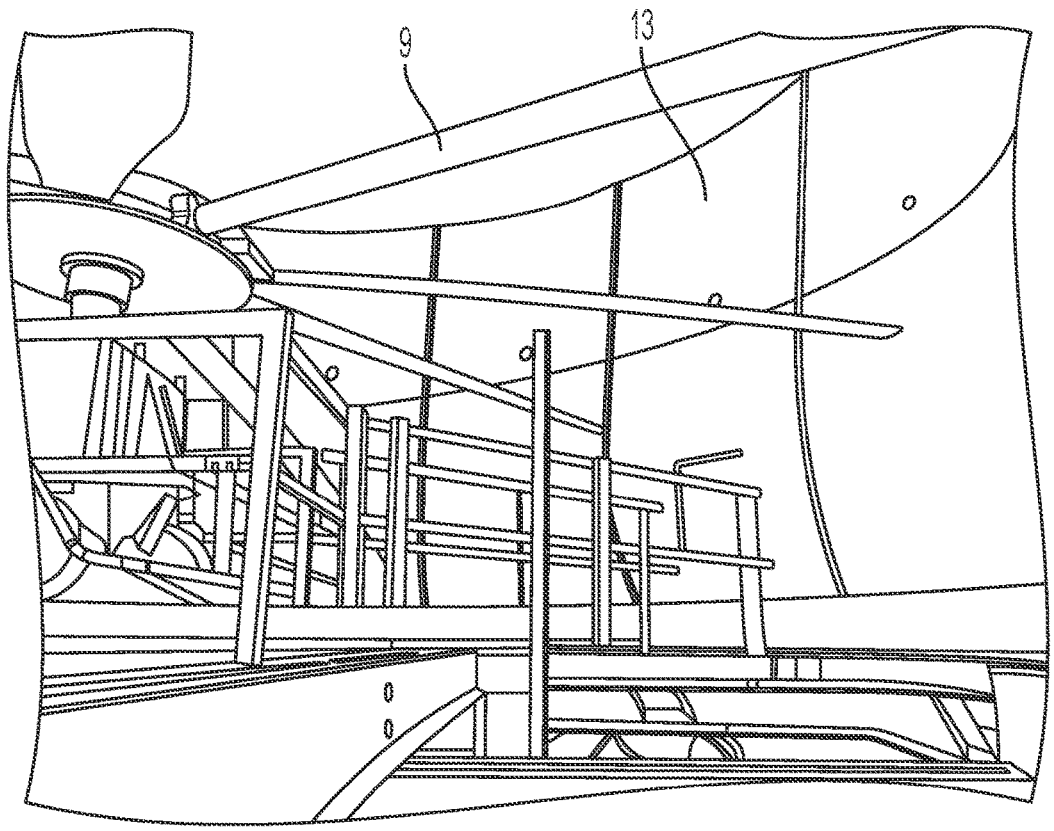
FIG. 2 is an interior view of a fan cylinder according to an embodiment of the invention.

Features in the attached drawings are numbered with the following reference numerals:
1 cooling tower fan cylinder
3 basic segment
5 motor segment
7 access segment
9 fan blades
11 wall element
13 interior facing surfaces
15 exterior facing surfaces
17 integrally molded vertical rib
19 integrally molded horizontal ribs
21 flanges
23 horizontal rib stiffener
25 access slot
27 top ring stiffener
29 lifter bar
31 lifter cup holder

DETAILED DESCRIPTION OF THE INVENTION

Figure 3:
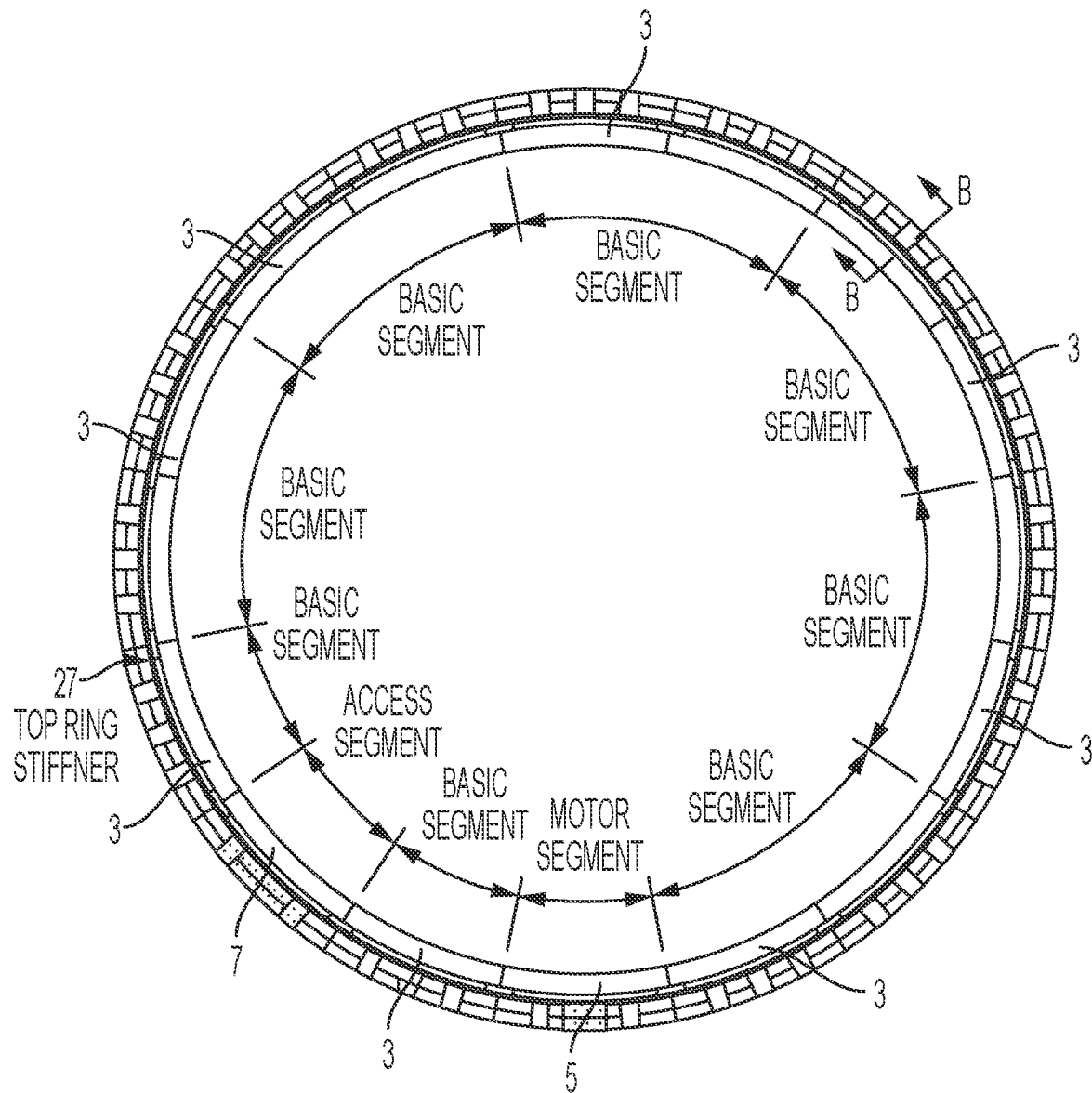
FIG. 3 is a plan view of a fan cylinder according to an embodiment of the invention

The cooling tower fan cylinder 1 of the invention may be composed of multiple segments, including a plurality of basic segments 3, a motor segment 5 and an access segment 7. The segments 3, 5 and 7 are assembled to form a generally hourglass shaped cooling tower fan cylinder 1, see, e.g., FIG. 3. The fan cylinder 1 according to the invention is configured to house and protect fan blades 9, reduce sound and vibration, and enhance performance.

The segments 3, 5 and 7 are preferably molded fiberglass composite structures, including a wall element 11 having interior 13 and exterior 15 facing surfaces. The interior facing surface 13 of the wall element 11 of each basic segment 3 is smooth and relatively featureless (with the exception in at least some instances of a lifting bar, discussed below). Referring to FIGS. 4 and 11-15, the exterior facing surface 15 of the wall element 11 of each segment features integrally molded vertical 17 and horizontal 19 ribs that intersect with one-another at right angles. At their lateral edges, the segments have flanges 21 which are used to bolt the segments to one-another. See, e.g., FIG. 17.

Figure 4:
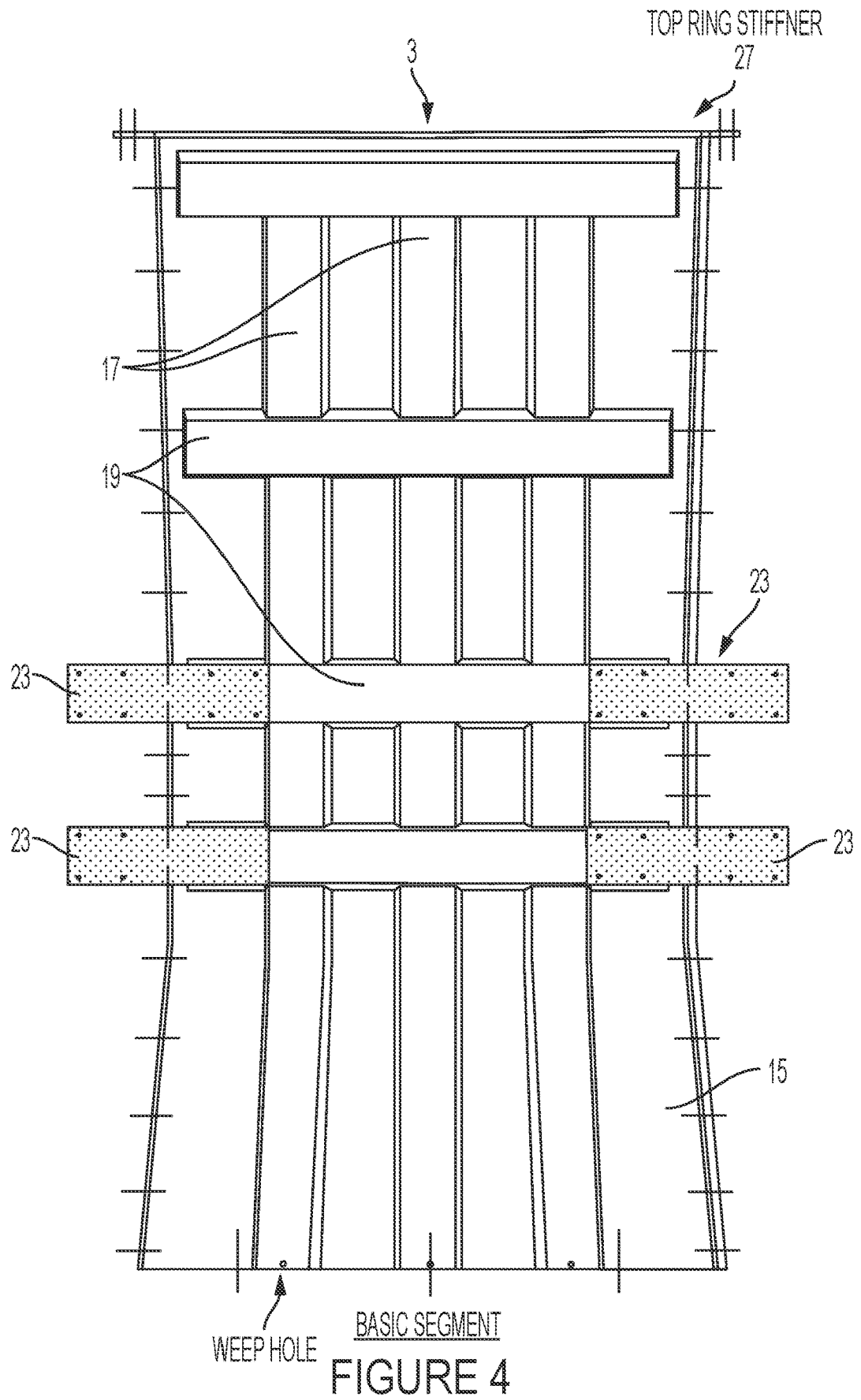
FIG. 4 is an elevation view of a basic segment of a fan cylinder according to an embodiment of the invention.
Figure 5:
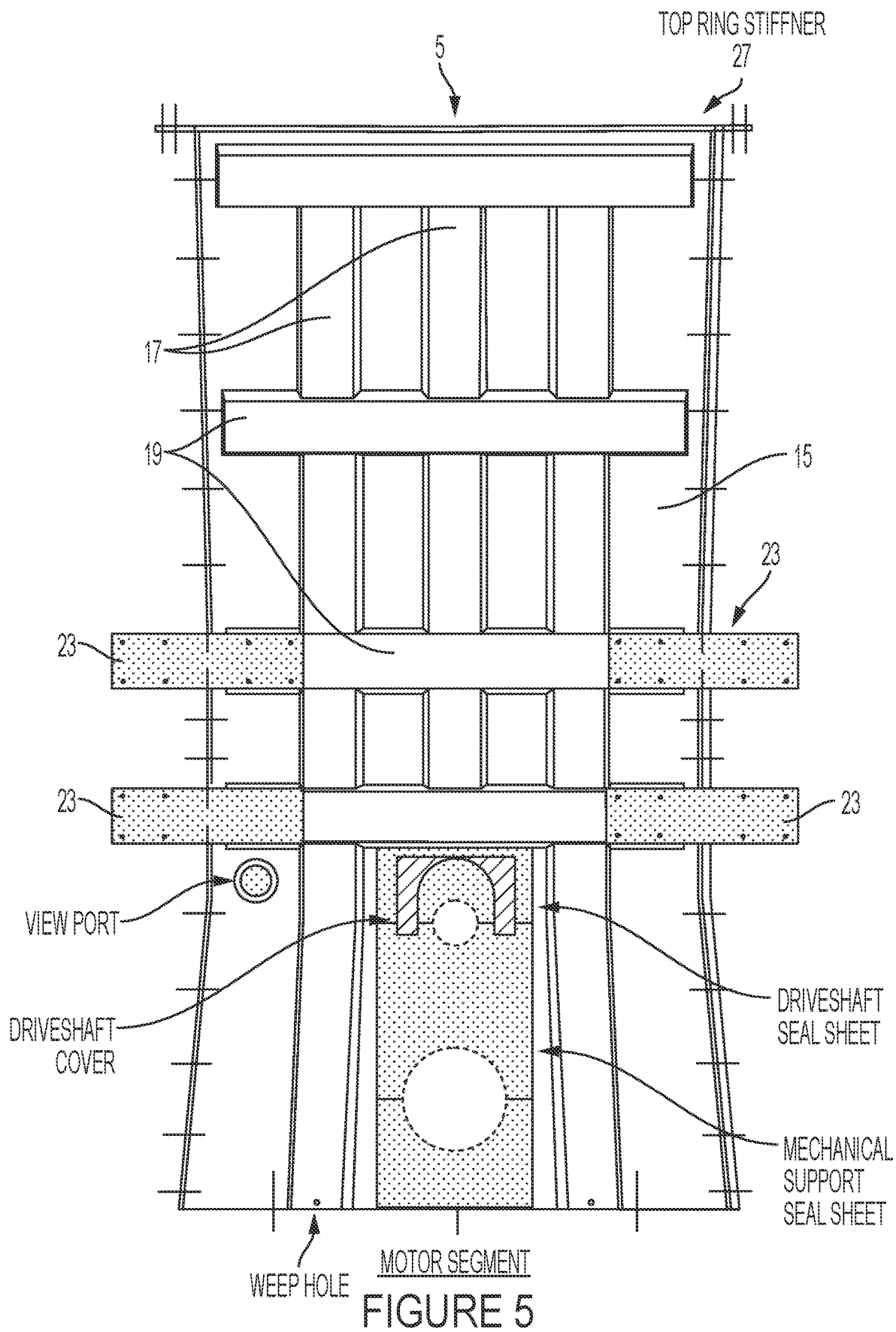
FIG. 5 is an elevation view of a motor segment of a fan cylinder according to an embodiment of the invention.
Figure 6:
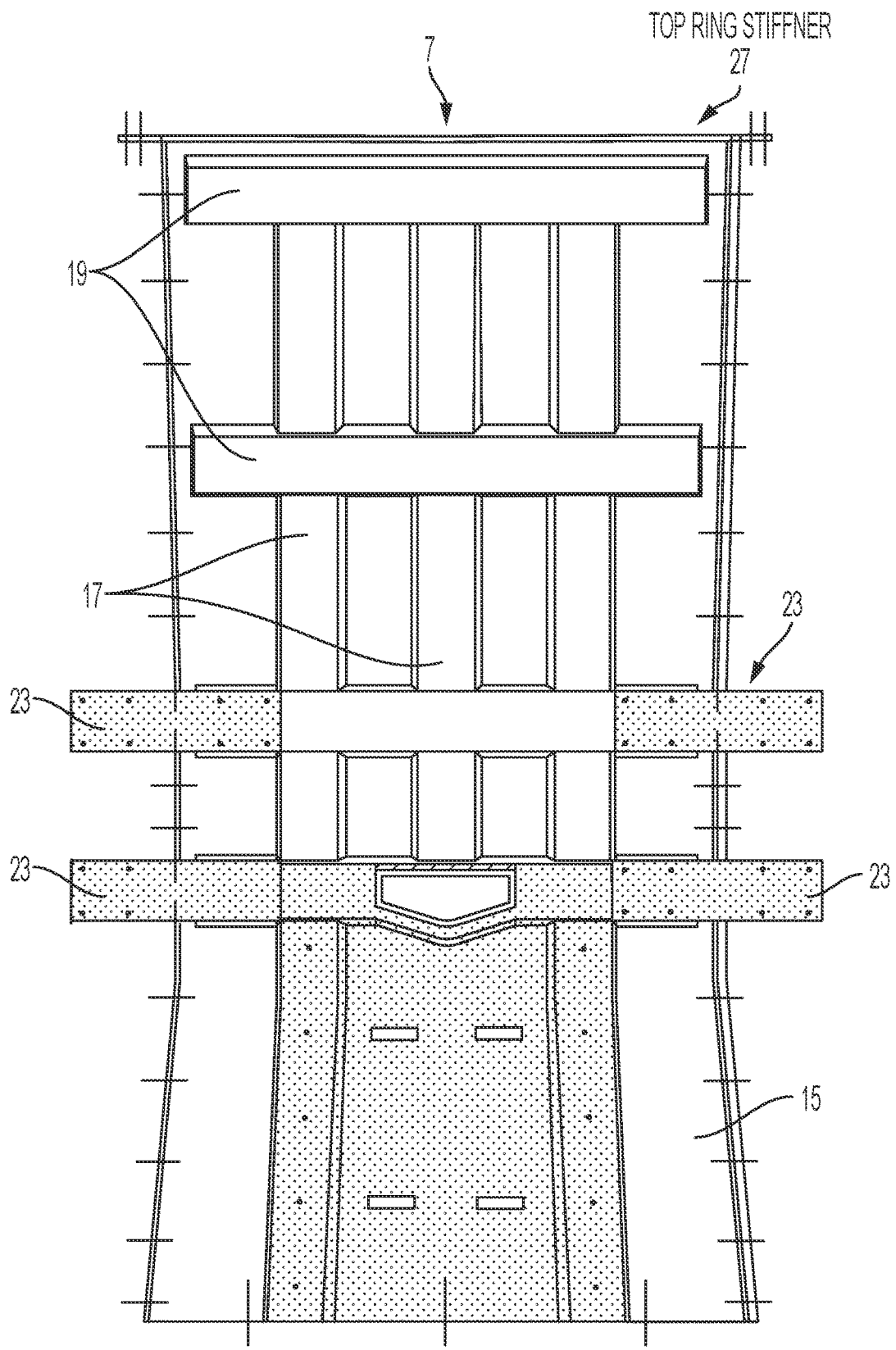
FIG. 6 is an elevation view of an access segment of a fan cylinder according to an embodiment of the invention.
Figure 7:
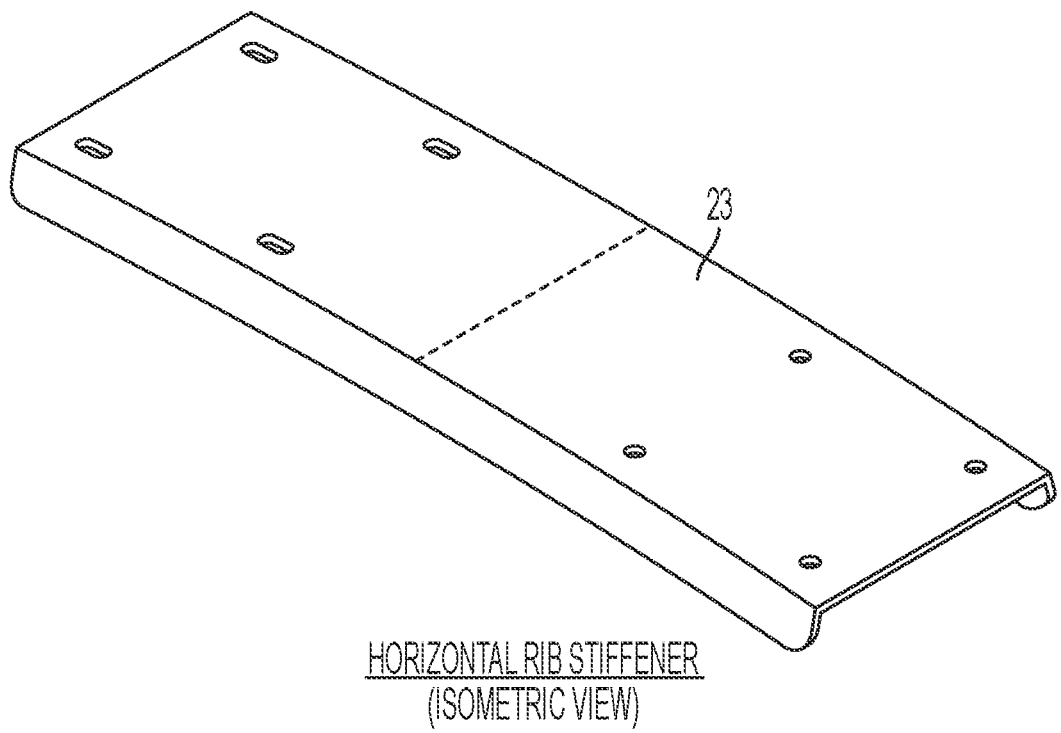
FIG. 7 is an isometric view of a horizontal rib stiffener according to an embodiment of the invention.
Figure 8:
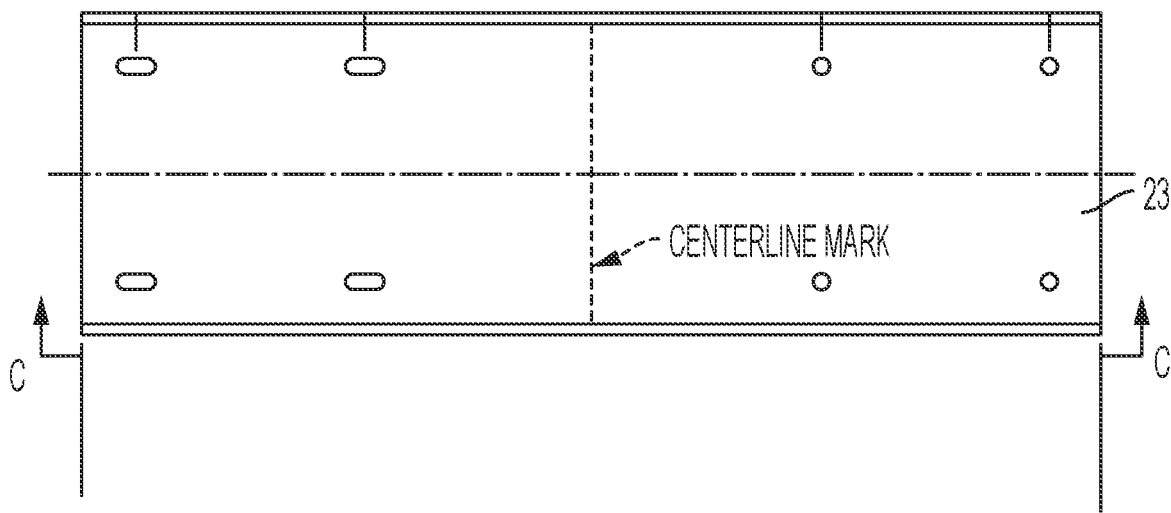
FIG. 8 is a plan view of the horizontal rib stiffener of FIG. 7.
Figure 9:
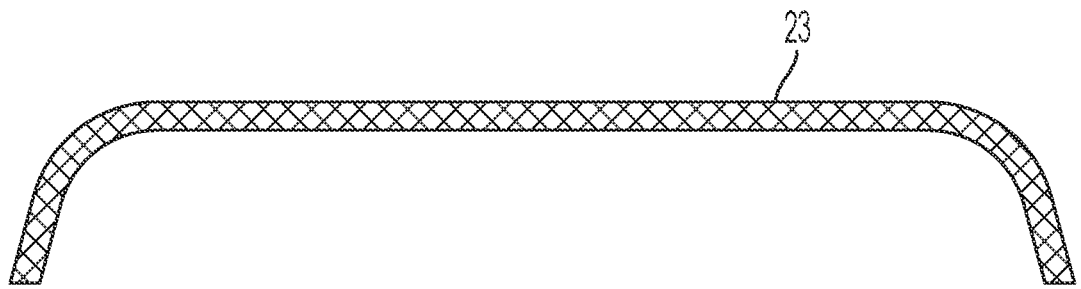
FIG. 9 is a section view along line B-B of FIG. 10.
Figure 10:
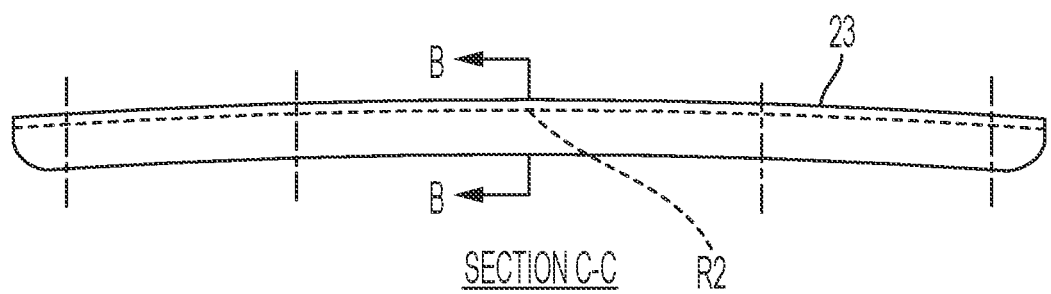
FIG. 10 is a section view along line C-C of FIG. 8

The fan cylinders 1 may further include a horizontal rib stiffener 23 which attaches at one end to a horizontal rib 19a of one segment and at a second end to the corresponding horizontal rib 19b of the adjacent segment. See FIGS. 4-10 and 17. One horizontal rib stiffener 23 is preferably installed at every junction between adjacent segments. Optionally, two rib stiffeners 23 may be provided at each junction between adjacent segments to join two horizontal ribs 19 in the throat area of the fan cylinder 1, as shown in FIGS. 4-6.

Figure 11:
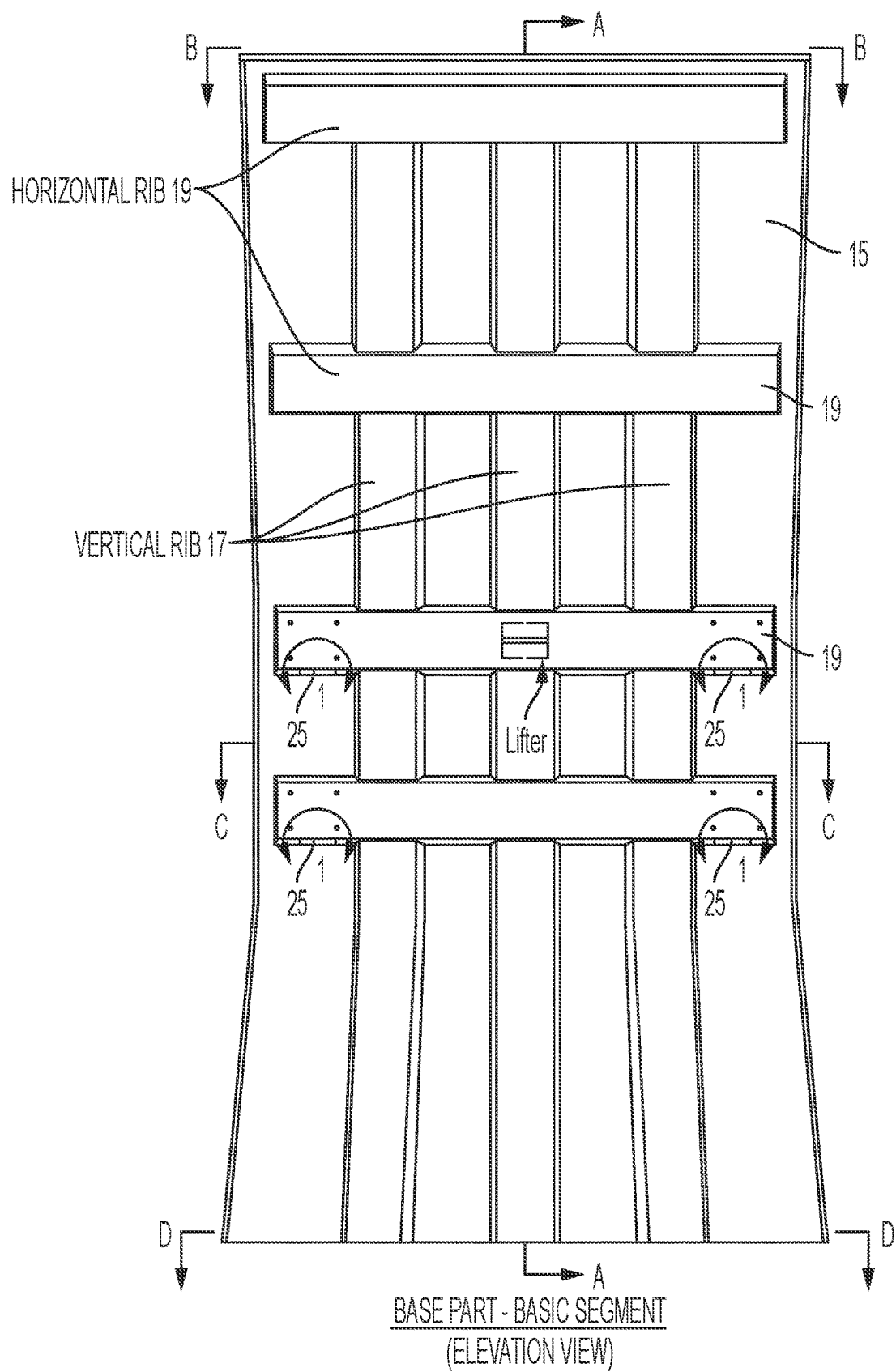
FIG. 11 is another elevation view of a basic segment of a fan cylinder according to an embodiment of the invention.
Figure 12:
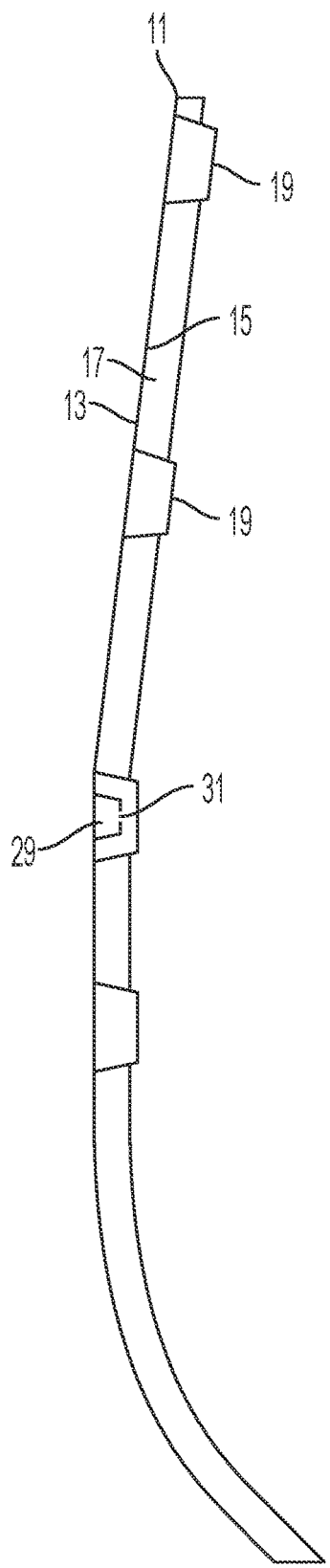
FIG. 12 is a section view along line A-A in FIG. 11.
Figure 13:
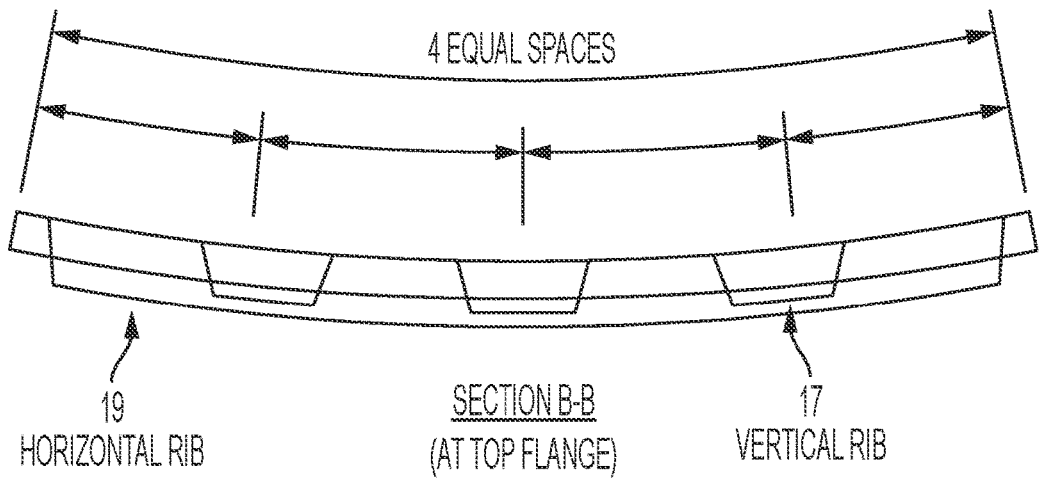
FIG. 13 is a section view along line B-B of FIG. 11.
Figure 14:
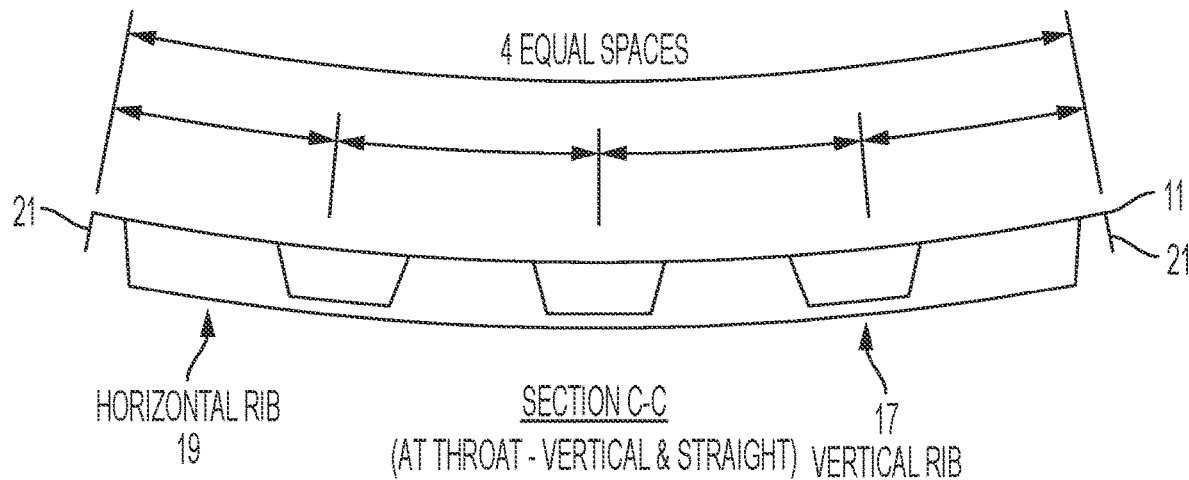
FIG. 14 is a section view along line C-C of FIG. 11.
Figure 15:
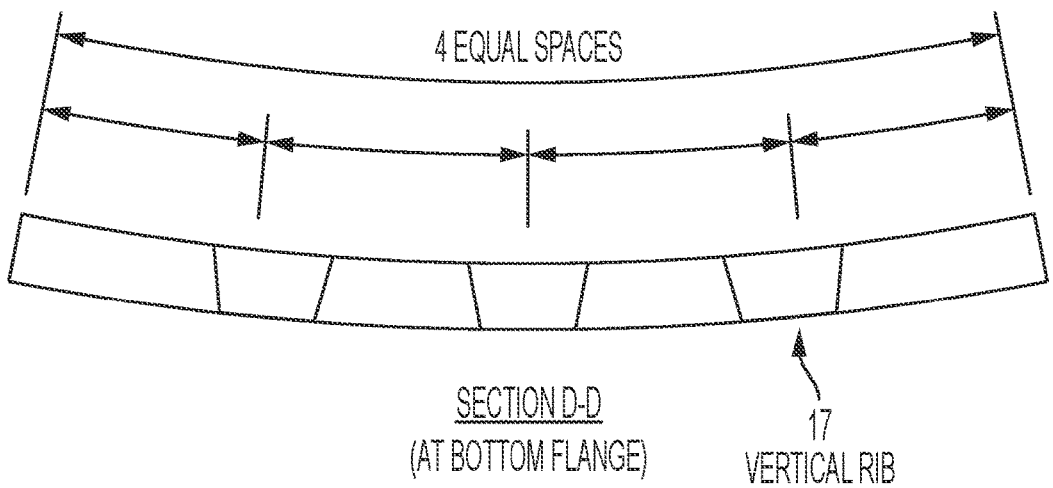
FIG. 15 is a section view along line D-D of FIG. 11.
Figure 16:
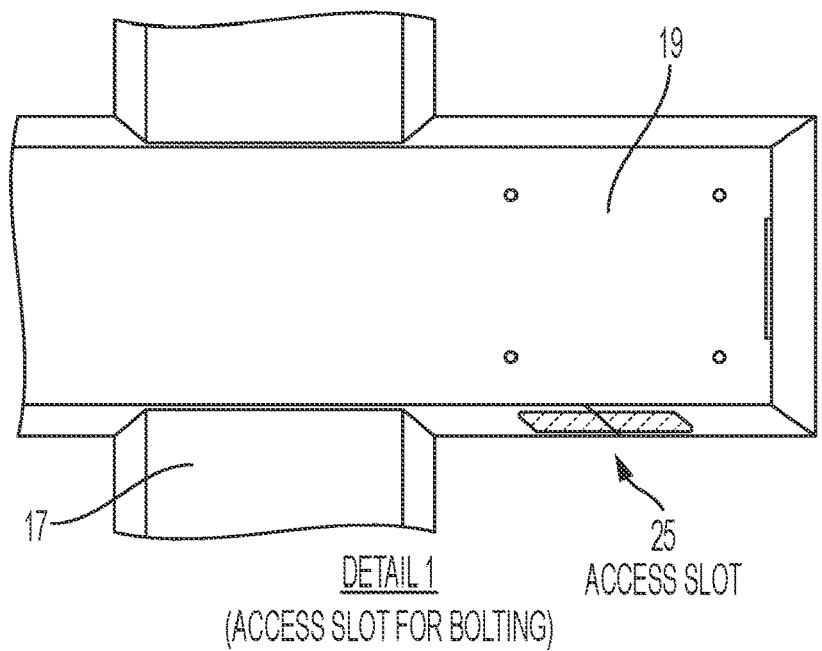
FIG. 16 is a detail view of FIG. 11 showing the connection points for a horizontal rib stiffener.
Figure 17:
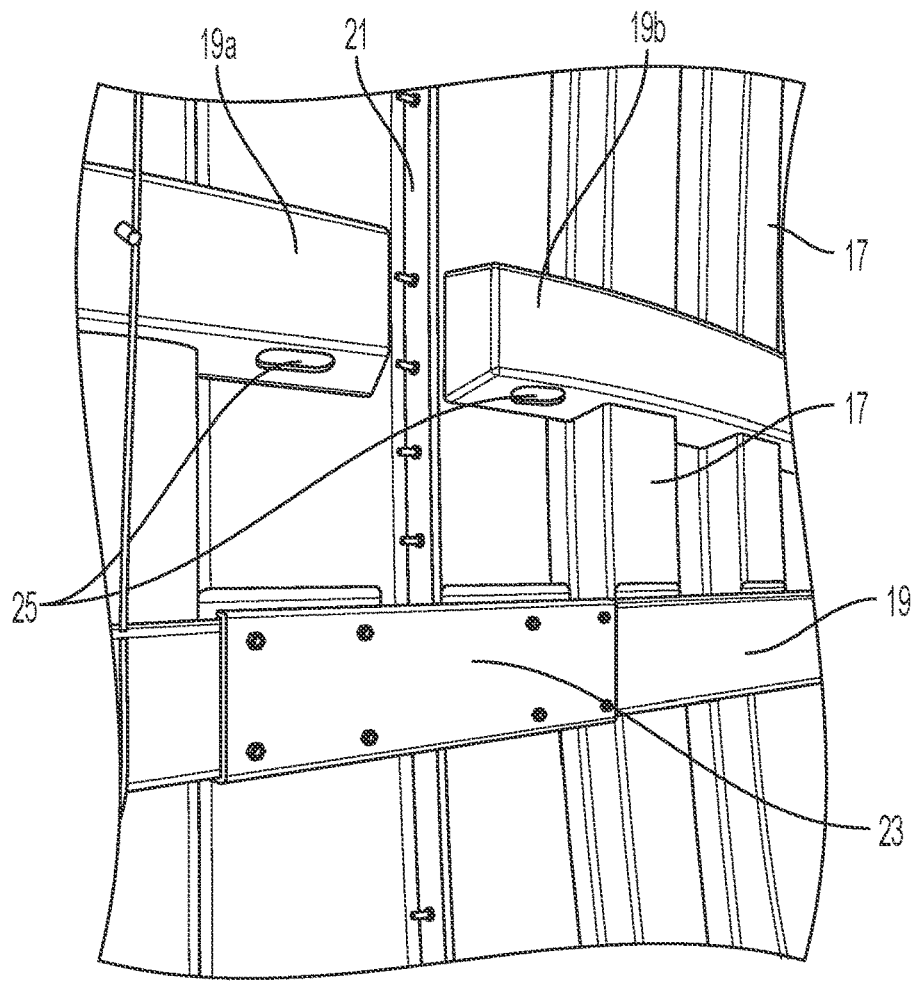
FIG. 17 is a perspective view of a horizontal rib stiffener joining two adjacent segments of a fan cylinder according to an embodiment of the invention.
Figure 18:
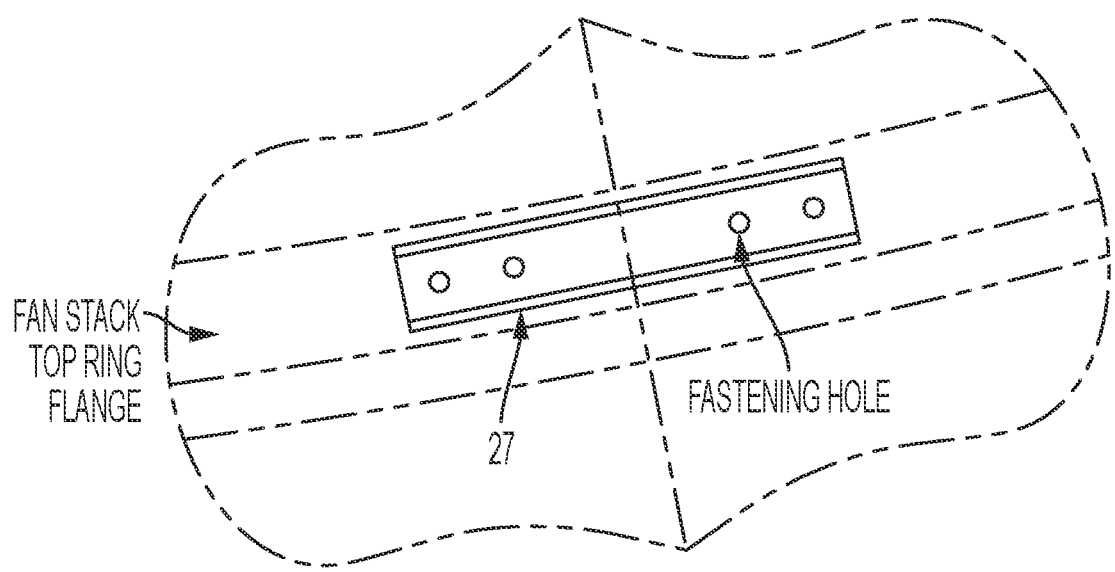
FIG. 18 is a plan view of a top ring stiffener according to an embodiment of the invention.
Figure 19:
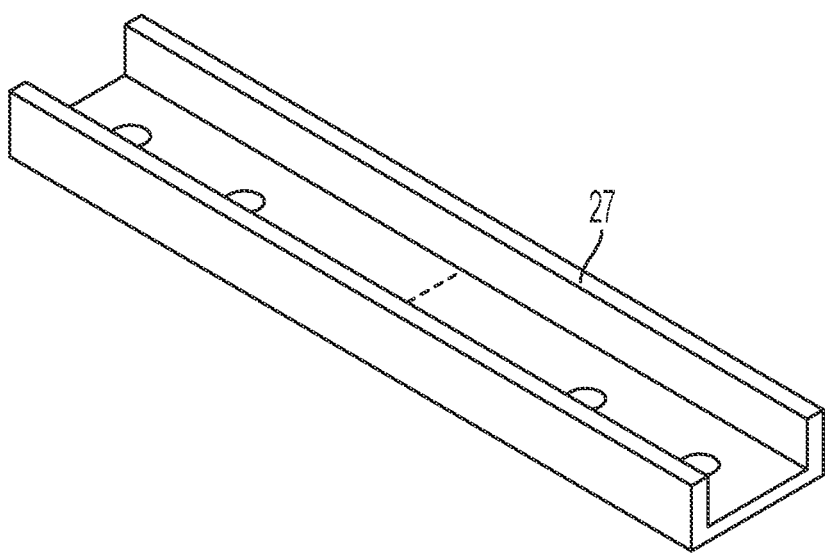
FIG. 19 is an isometric view of a top ring stiffener according to an embodiment of the invention.
Figure 20:
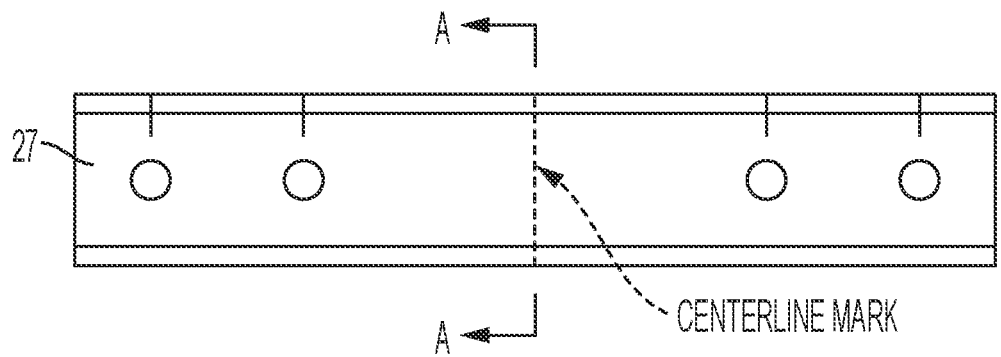
FIG. 20 is another plan view of a top ring stiffener according to an embodiment of the invention.
Figure 21:
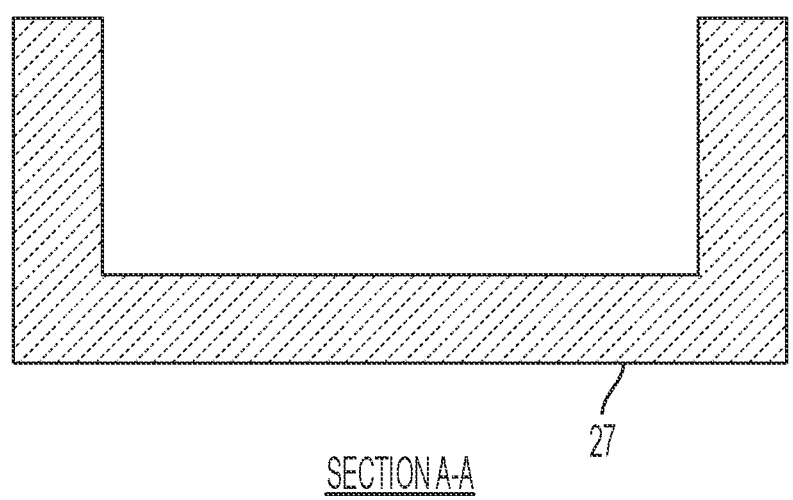
FIG. 21 is a section view along line A-A of FIG. 20.
Figure 22:
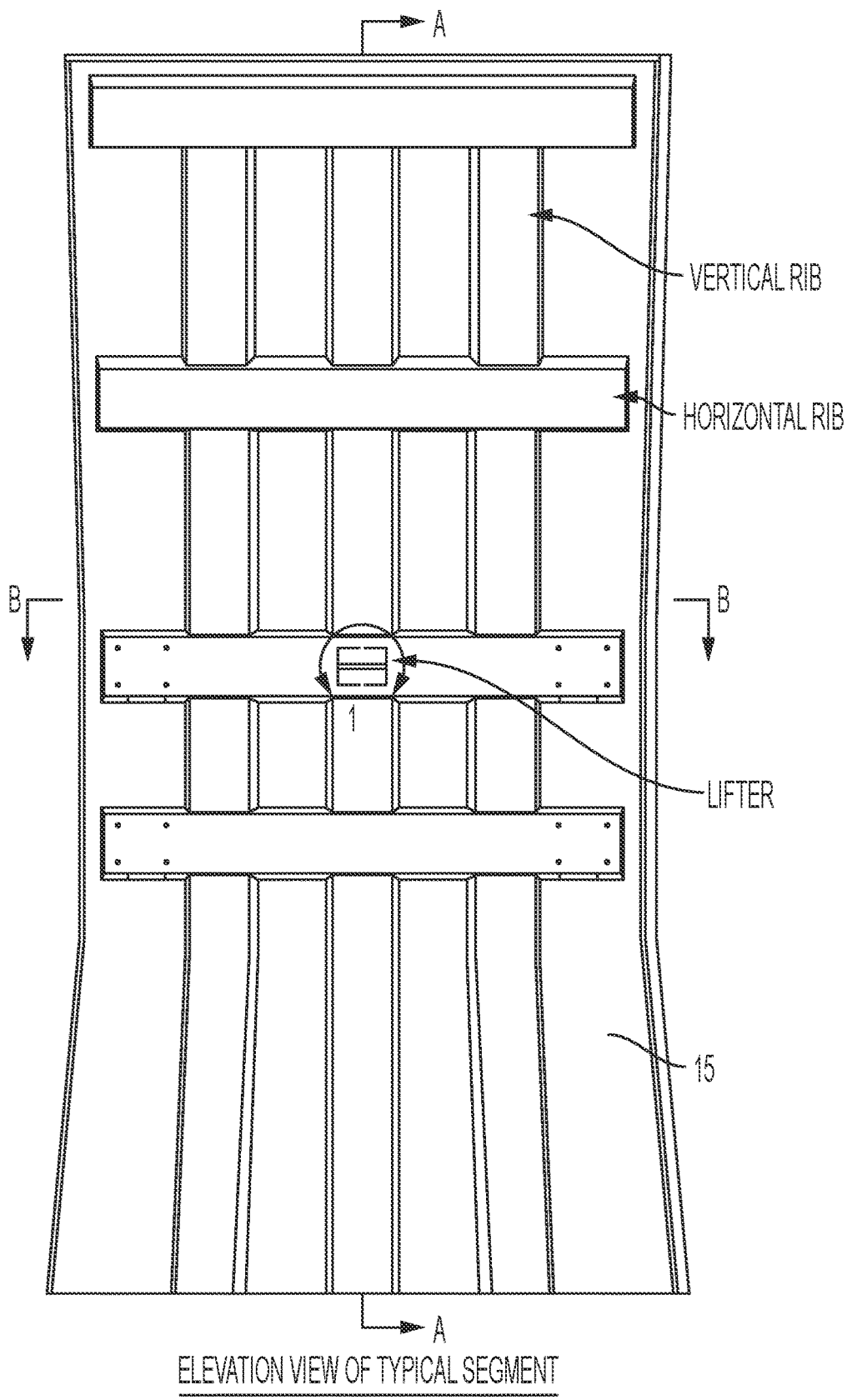
FIG. 22 is an elevation view of a segment according to an embodiment of the invention.
Figure 23:
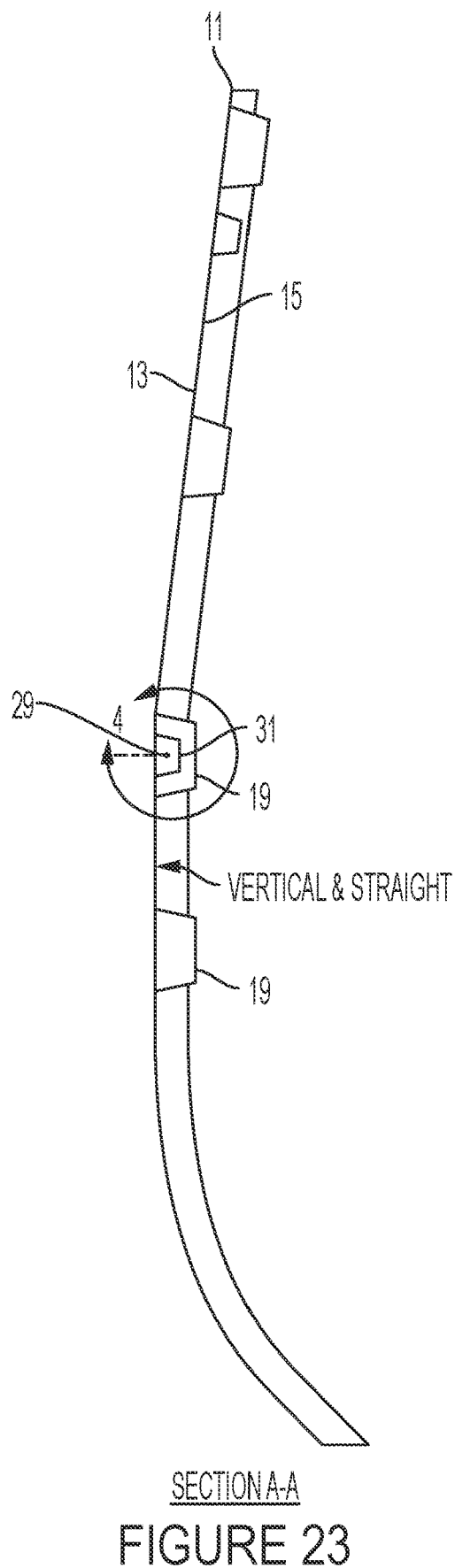
FIG. 23 is a section view along line A-A of FIG. 22.
Figure 24:
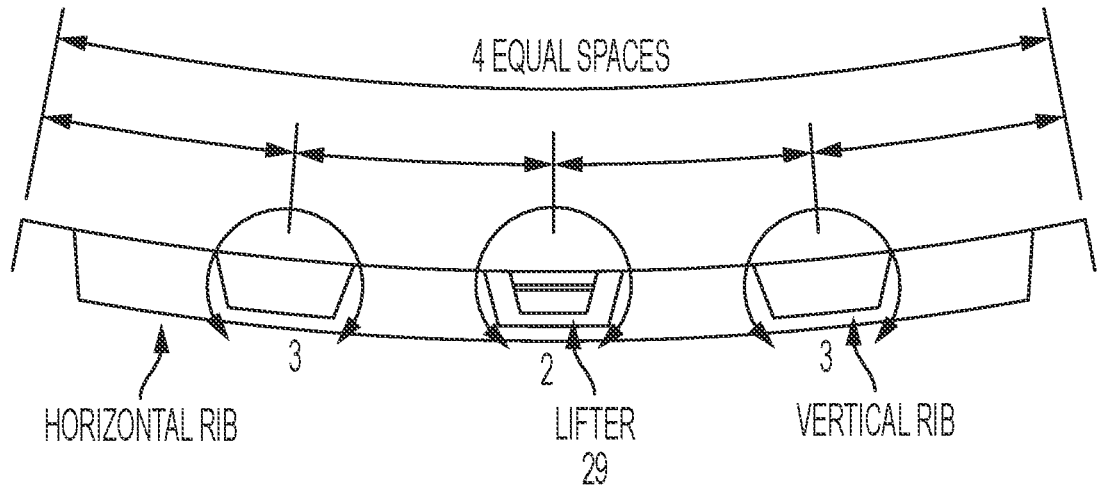
FIG. 24 is a section view along line B-B of FIG. 22.
Figure 25:
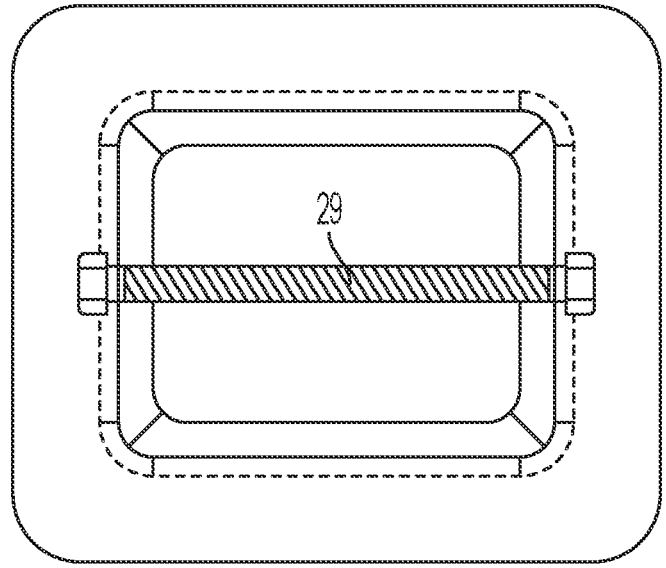
FIG. 25 is a detailed view of a lifter bar according to an embodiment of the invention.
Figure 26:
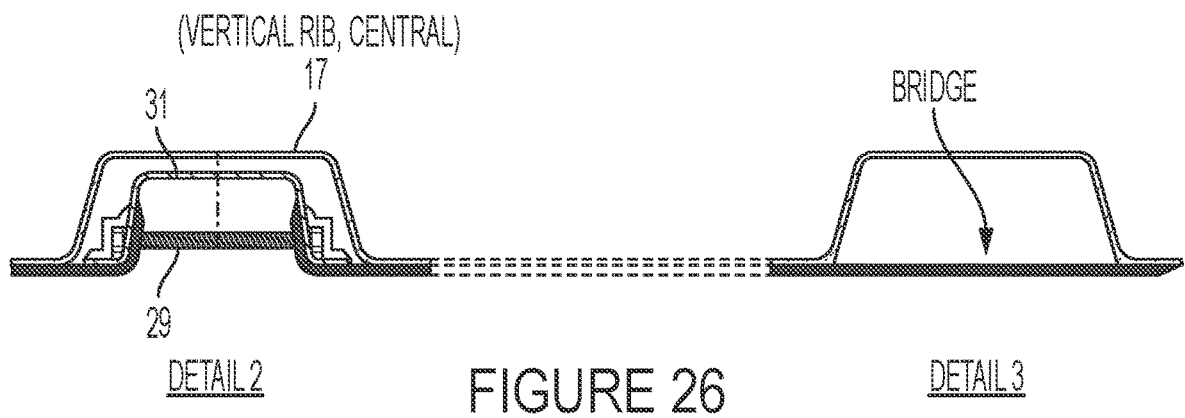
FIG. 26 shows detailed views 2 and 3 from FIG. 24.
Figure 27:
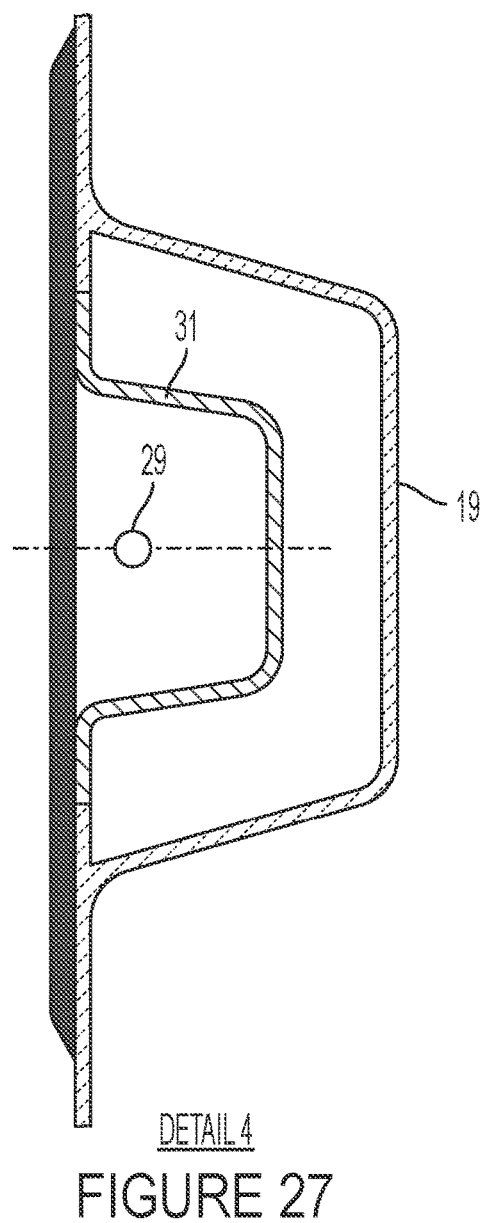
FIG. 27 shows detailed view 4 from FIG. 23.

An access slot 25 may be provided at each end of a horizontal rib, bottom side, to facilitate bolting of the rib stiffeners 23 to the horizontal ribs 19a and 19b of adjacent segments, See FIGS. 11, 16 and 17. A top ring stiffener 27 may be installed at the junction of each two adjacent segments in the top ring flange, see FIGS. 18-21.

According to a further embodiment of the invention, at least three segments are provided with a lifter bar 29, accessible from the inside surface of the wall. See FIGS. 22-27. The lifter bar 29 may be horizontally secured to a lifter cup holder 31 that is integrally molded inside a central vertical rib of the segment. The lifter bar 29 may be used to secure cables or straps to hoist an assembled fan cylinder into its final location. The lifter bar 29 may also be used to secure a safety harness for workers servicing equipment in the interior space defined by the fan cylinder. The height of the lifter bar 29 from the bottom of the segment may be situated for use both as a lifting point and as a safety harness securing point.

It is specifically contemplated that every feature embodiment disclosed herein may be used together with every other feature and embodiment disclosed herein.

The description of the invention is merely exemplary in nature and, thus, variations that do not depart from the concept of a segmented cooling tower fan cylinder are intended to be within the scope of the invention. Any variations from the specific embodiments described herein but which otherwise segmented cooling tower fan cylinder should not be regarded as a departure from the spirit and scope of the invention set forth in the following claims.

The invention claimed is:

1. A cooling tower fan cylinder comprising:
a plurality of modular segments, each of said plurality of modular segments having a top edge, a bottom edge, a first side edge, and a second side edge, a first side edge flange on said first side edge, and a second side edge flange on said second side edge, said plurality of modular segments including a plurality of standard segments, a motor segment, and an access segment;
said motor segment configured to allow the passage of power and mechanical elements associated with driving a fan motor;
said access segment configured to allow the passage of a technician into an interior of said cooling tower fan cylinder;
said plurality of standard segments, said motor segment and said access segment configured to be assembled horizontally adjacent to one-another into said cooling tower fan cylinder;
each of said plurality of standard segments, said motor segment and said access segment comprising on exterior facing surfaces a plurality of integrally molded vertical ribs equally spaced across said exterior facing surfaces between said first side edge and said second side edge and integrally molded horizontal ribs between said top edge and said bottom edge,
said cooling tower fan cylinder further comprising
a plurality of horizontal rib stiffeners configured to connect said horizontal ribs on adjacent ones of said plurality of modular segments;
said plurality of standard segments, said motor segments and said access segment each having, in vertical cross-section, an outwardly curved bottom portion so that
said cooling tower fan cylinder, when assembled, has a bottom section in the shape of a flared cylinder.

2. The cooling tower fan cylinder of claim 1, further comprising a lifter bar provided inside a central vertical rib of each of three of said plurality of modular segments equally spaced about said cooling tower fan cylinder and configured to be accessed from an interior of said cooling tower fan cylinder.

3. The cooling tower fan cylinder of claim 1 having an open air outlet top and an open air inlet bottom and configured for placement atop a cooling tower and for housing a cooling tower fan.

4. The cooling tower fan cylinder of claim 1 said horizontal rib stiffeners and said integrally molded horizontal ribs having matching U-shaped profiles when viewed in cross-section, and wherein said horizontal rib stiffeners are configured to fit over top ends of said integrally molded horizontal ribs in a nested fashion.

5. The cooling tower fan cylinder of claim 1 wherein each of said standard segments, said motor segment and said access segment have a top width, a bottom width and a center width when viewed face-on, said top width and said bottom width both larger than said center width, such that when assembled, said cooling tower fan cylinder generally has an hourglass shape.

6. A method for assembling and mounting a modular fan cylinder on a cooling tower, said method comprising:
assembling, at ground level, a plurality of fan cylinder segments into said modular fan cylinder by arranging said plurality of fan cylinder segments adjacent to one-another in a shape of a ring, each of said plurality of fan cylinder segments having a top edge, a bottom edge, a first side edge and a second side edge, and a side edge flange on each of said first side edge and said second side edge; connecting said side edge flanges on adjacent ones of said plurality of fan cylinder segments to one-another; said plurality of fan cylinder segments including standard fan cylinder segments, a fan cylinder motor segment and a fan cylinder access segment;
wherein said plurality of standard fan cylinder segments, said fan cylinder motor segment and said fan cylinder access segment each comprise on exterior facing surfaces a plurality of integrally molded three-sided vertical ribs equally spaced across said exterior facing surfaces between said first side edge and said second side edge and integrally molded horizontal ribs between said top edge and said bottom edge;

said modular fan cylinder having a bottom portion in the shape of a flared cylinder;

said method further comprising attaching horizontal rib stiffeners to said integrally molded horizontal ribs of adjacent ones of said plurality of fan cylinder segments, said horizontal rib stiffeners and said integrally molded horizontal ribs having matching U-shaped profiles;

attaching a hoisting rig to lifter bars arranged in at least three of said plurality of standard fan cylinder segments and accessible from an interior of said tower fan cylinder;

lifting said modular fan cylinder using said hoisting rig and lifter bars, and placing said modular fan cylinder atop a cooling tower.

\* \* \* \* \*